(12) United States Patent
Crabb

(10) Patent No.: US 6,609,575 B1
(45) Date of Patent: Aug. 26, 2003

(54) ADJUSTABLE LINK ASSEMBLY

(75) Inventor: Elmer R. Crabb, Granbury, TX (US)

(73) Assignee: Agco Corporation, Duluth, GA (US)

( * ) Notice: Subject to any disclaimer, the term of this patent is extended or adjusted under 35 U.S.C. 154(b) by 0 days.

(21) Appl. No.: 09/628,484

(22) Filed: Jul. 31, 2000

(51) Int. Cl.$^7$ ............................ A01B 59/043; F16B 7/06
(52) U.S. Cl. ........................ 172/439; 403/46; 280/491.2
(58) Field of Search ............................... 172/439, 677, 172/679; 403/43, 44, 45, 46, 47, 48; 280/461.1, 477, 478.1, 479.1, 479.2, 482, 491.1, 491.2

(56) References Cited

U.S. PATENT DOCUMENTS

| | | | | |
|---|---|---|---|---|
| 1,411,279 A | * | 4/1922 | Jaynes ........................ | 403/46 |
| 2,541,964 A | | 2/1951 | Hennings | |
| 2,648,997 A | * | 8/1953 | Sawyer ........................ | 74/586 |
| 2,845,288 A | * | 7/1958 | Cierpik, Jr. .................. | 403/46 |
| 2,878,043 A | * | 3/1959 | Edman et al. ................. | 403/46 |
| 2,920,500 A | | 1/1960 | Edman | |
| 2,929,458 A | | 3/1960 | Cole | |
| 3,053,552 A | | 9/1962 | Horney | |
| 3,371,945 A | | 3/1968 | Adams et al. | |
| 3,384,937 A | * | 5/1968 | Muncke et al. ............... | 172/439 |
| 3,731,951 A | * | 5/1973 | Gruenberger ................. | 172/439 |
| 3,851,978 A | * | 12/1974 | Kuipers ........................ | 403/45 |
| 4,194,757 A | | 3/1980 | Lucas et al. | |
| 4,418,935 A | * | 12/1983 | O'Connor .................... | 403/46 |
| 4,778,194 A | * | 10/1988 | Koch et al. ................... | 403/46 |
| 5,076,369 A | | 12/1991 | Herchenbach | |
| 5,765,957 A | * | 6/1998 | Connell ........................ | 403/46 |
| 6,056,069 A | | 5/2000 | Hagen et al. | |
| 6,089,328 A | * | 7/2000 | Moore et al. ................. | 172/439 |

FOREIGN PATENT DOCUMENTS

GB    2103064 A    2/1983

* cited by examiner

Primary Examiner—Robert E. Pezzuto
Assistant Examiner—Nathan Mammen
(74) Attorney, Agent, or Firm—Gerald R. Boss; Troutman Sanders LLP

(57) ABSTRACT

An adjustable link assembly is provided that includes a first and a second rod each threadably engaging a bore of a body portion. A locking mechanism is slidably disposed about generally the entire length of the body portion. Locking mechanism includes an engagement portion and a lever. The lever has an eye that engages a post on the first rod to deter relative motion between the body portion and the first and second rods.

18 Claims, 3 Drawing Sheets

ADJUSTABLE LINK ASSEMBLY

TECHNICAL FIELD

The present invention relates generally to a hitch for a work machine, and more particularly to an adjustable link assembly for a hitch.

BACKGROUND ART

Agricultural work machines, such as tractors, typically include a hitch arrangement for coupling a work implement to the work machine. The hitch arrangement generally includes three link assemblies. One link assembly is interposed the work machine frame and the implement and is adjustable in length to control the angle of the implement with the horizontal in the working position. This link is sometimes referred to as a pitch link. The other two link assemblies are used to connect a pair of draft arms to a pair of rocker arms and are generally called lift links. These link assemblies are also adjustable in length to control the raise and lower positions of the implement.

Heretofore, various designs have been utilized to accomplish the above adjustments. These designs have included devices wherein relative rotation between an internally threaded sleeve and an externally threaded rod provides such adjustment. For example, a wrench can be used to accomplish the rotation. However, utilizing a separate tool such as a wrench is inconvenient for the operator and the tool must constantly be carried in order to make the appropriate adjustments. Additionally, the problem of the length of the link assembly inadvertently changing during operation is not addressed. In particular, vibrations generated during operation are communicated to the internally threaded sleeve and the externally threaded rod and can cause relative rotation there between. As a result, the length of the link assembly inadvertently changes during operation, which can adversely effect the performance of a work function. This requires some type of locking mechanism to hold the internally threaded sleeve and the externally threaded rod from rotating relative to one another.

In an attempt to address the aforementioned problem, some coupling arrangements include a latch for preventing the relative rotation between the internally threaded sleeve and the externally threaded rod. Some of these latches are designed so that when they are unlatched they can function as a handle, which is attached to the internally threaded sleeve or the externally threaded rod. This handle is grasp and rotated by the operator of the work machine so as to cause relative rotation between these elements and thereby change the length of the link assembly. One such link assembly is disclosed in U.S. Pat. No. 4,194,757 issued Mar. 25, 1980 and assigned to the Allis-Chalmers Corporation Milwaukee, Wis. A drawback with this type of latch is that it is permanently attached to the link assembly, which significantly decreases the flexibility with which the latch can be positioned during the time it is used as a handle. As a result, these types of latches are difficult to use and decrease the efficiency with which an operator can adjust the length of the link assembly. A further design that appropriately addresses this problem is U.S. Pat. No. 6,056,069 issued May 2, 2000, assigned to the owner of the present application, however it utilizes a separate pin to hold the handle in the locked position.

The present invention is directed to overcoming one or more of the problems as set forth above

DISCLOSURE OF THE INVENTION

In one aspect of the present invention an adjustable link assembly is provided that includes a body portion that has a polygonal shape in cross-section and an internally threaded bore. A first rod threadably engages the internally threaded bore of the body portion. A second rod engages the internally threaded bore of the body portion. A locking mechanism that includes a lever and an engagement portion, the engagement portion has an internal passage. The internal passage has a polygonal shape larger than and slidably engaging generally the entire length of the polygonal shape of the body portion.

BEST MODE FOR CARRYING OUT THE INVENTION

Figure 1:
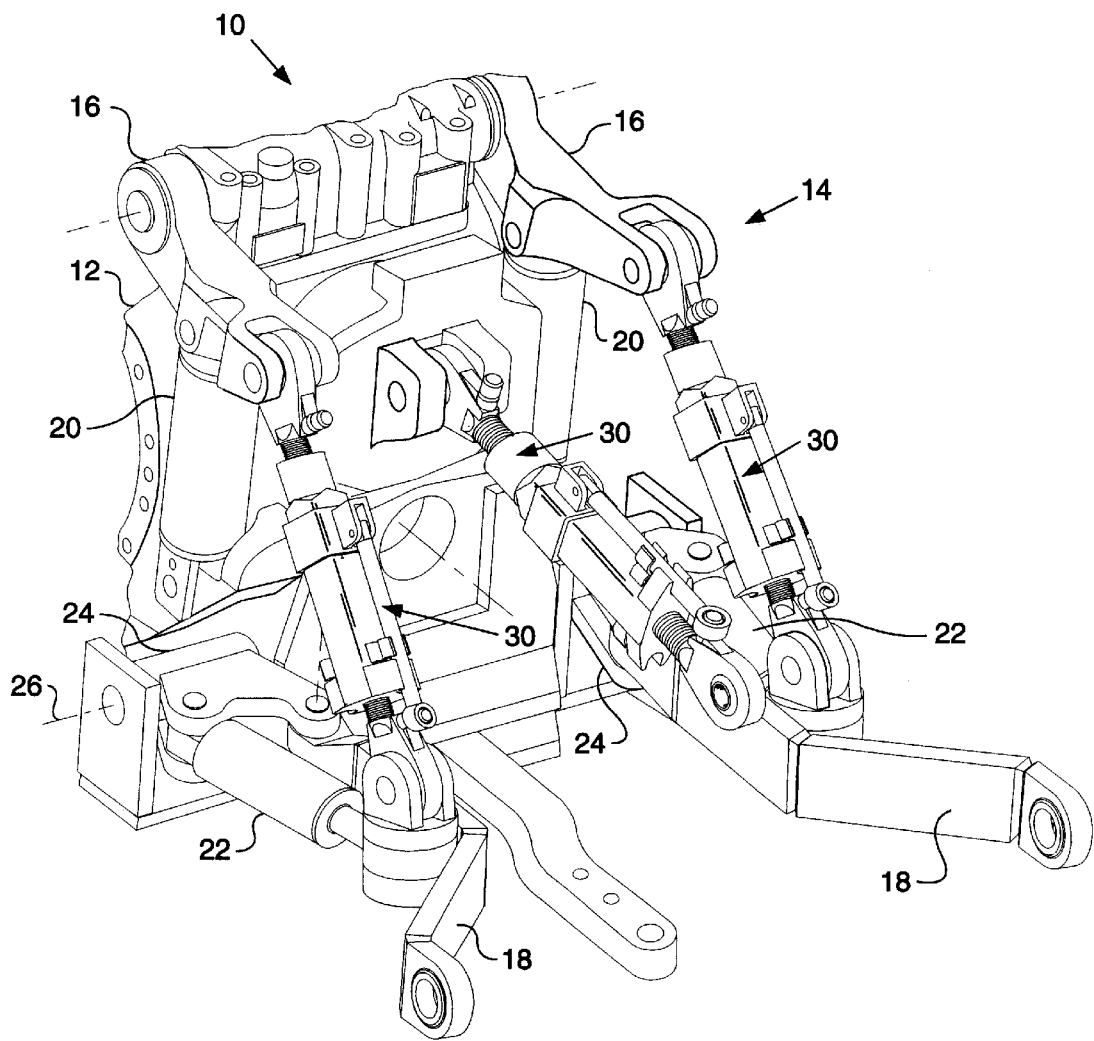
FIG. 1 shows a diagrammatic perspective view of a hitch assembly embodying the present invention.

Referring now to FIG. 1, there is shown a portion of an exemplary work machine 10. Work machine 10 includes a frame 12 and a hitch assembly 14 extending from frame 12. Hitch assembly 14 includes a pair of rocker arms 16, which are pivotally secured to frame 12. Hitch assembly 14 also includes a pair of draft arms 18, which are each also pivotally secured to frame 12. Hitch assembly 14 also includes a pair of first actuators 20. One end of each first actuator 20 is pivotally attached to one of the rocker arms 16, while the other end of each first actuator 20 is pivotally attached to frame 12. A pair of second actuators 22 is also included. One end of each second actuator 22 is pivotally connected to each draft arm 18 and the other end of each actuator 22 is pivotally connected to an intermediate connector 24. Each intermediate connector 24 pivots about a common axis 26. Hitch assembly 14 also includes three adjustable link assemblies 30 that operate as turn buckles. Two of the adjustable link assemblies 30 are interposed between and secured to one rocker arm 16 and one draft arm 18. Additionally, a single link assembly is elevationally spaced and centrally positioned between the pair of draft arms 18.

Figure 2:
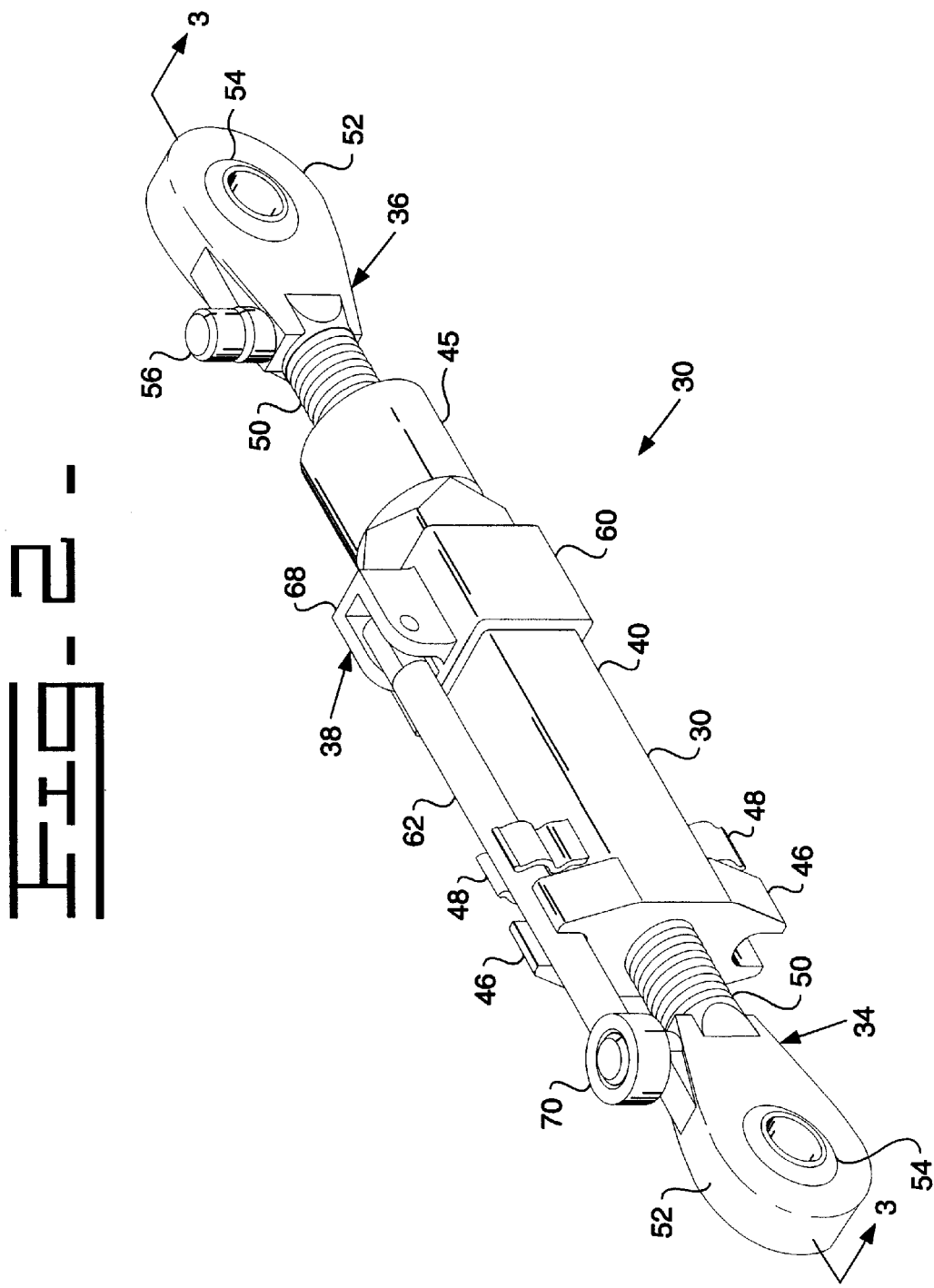
FIG. 2 is a perspective view of an adjustable link assembly of the present invention shown in an extended position.
Figure 3:
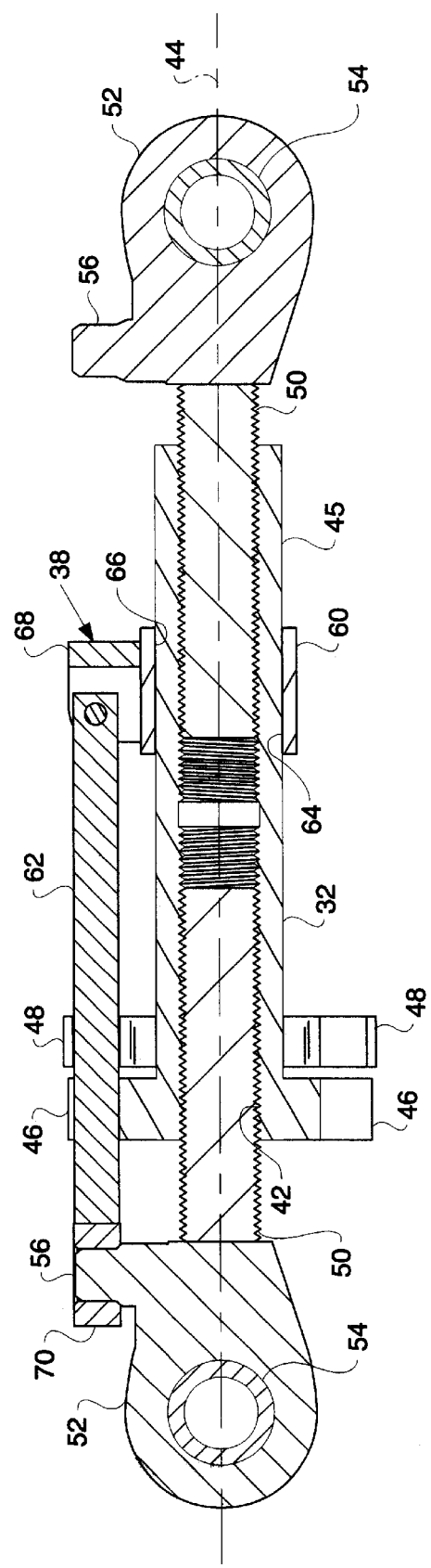
FIG. 3 is a sectional view of an adjustable link assembly, taken along line 3—3 of FIG. 2, shown fully retracted.

As seen in FIGS. 2 and 3 each adjustable link assembly 30 includes a body portion 32, first and second rod portions 34, 36, and a locking mechanism 38. Body portion 32 has a polygonal shape 40 as seen in FIG. 2. In this application the polygonal shape 40 is illustrated as being square. However, it should be understood that other cross sectional shapes could be used such as triangular, octagonal, or rectangular. Body portion 32 has an internally threaded bore 42 disposed therein and defines an axis 44 along its axial length. A pair of receivers 46 are positioned at one end of the body portion 32 and extend radially outward perpendicular to the axis 44. Body portion 32 also includes a cylindrical portion 45 extending along the axis 44 at the end opposite the receivers 46. Attached to the body portion 32 and adjacent to the receivers 46 is a pair of expandable retainers 48.

First and second rod portions 34, 36 have externally threaded end portions 50 and eye ends 52. The externally threaded end portions 50 of the first and second rod portions 34, 36 are positioned within and threadingly engage the internally threaded body portion 32. The eye ends 52 include a spherical ball joint 54 positioned therein. Spherical ball joints 54 allow the adjustable link assembly 30 to be swivelably connected to other hitch or implement components. Projecting outward from the base of each eye end 52 and generally perpendicular to the bore of the spherical ball joint 54 is a post 56. The adjustable link assemblies 30 are increased in length by separating the first and second rod portions 34, 36 when the body portion 32 is rotated in a first direction and retracted in length when the body portion 32 is rotated in a second direction.

The locking mechanism 38 includes an engagement portion 60 and a lever 62. Engagement portion 60 has an internal passage 64 that defines a polygonal shape 66 slightly larger than the polygonal shape 40 of the body portion 32. The engagement portion 60 is therefore matingly engaging and slidably disposed about the body portion 32. This allows the locking mechanism 38 to axially slide along generally the entire length of body portion 32. A receiving portion 68 is centrally positioned on one of the exterior facets of the engagement portion 60. One end of lever 62 is pivotally connected, as by pin, to the receiving portion 68. The pivotal connection allows lever 62 to be movable between a first position parallel to axis 44 and a second position perpendicular to axis 44. An eye 70 is positioned at the other end of the lever 62. Eye 70 is engagable with the posts 56 of the first or second rod portions 34, 36 when the lever 62 is in the first position parallel to axis 44 and is held in place by the expandable retainers 48.

INDUSTRIAL APPLICABILITY

In operation when the operator desires to either extend or retract one of the adjustable link assemblies 30 he or she performs several procedures. First the operator pulls the lever 62 loose from the expandable retainer 48 and pivots the lever 62 from the first position to the second position. In this position the engagement portion 60 can be slid along the body portion 32 to a location that offers the operator the greatest flexibility to perform the adjustment. The lever 62 is then used as a fulcrum to rotate engagement portion 60 and in turn the body portion 32 in the desired direction for the adjustment. The engagement portion 60 of the locking mechanism can then be slid along the body portion 32 until the internal passage 64 is disposed about the cylindrical portion 45. With the engagement portion 60 in this location the lever 62 can then be rotated in either a clockwise or counter clockwise direction without rotating the body portion 32.

Thus, an adjustable link assembly 30 is provided that permits flexibility to the operator for making adjustments, so as not to interfere with other hitch assembly 14 or work machine 10 components. The adjustable link assembly 30 does not contain or require loose components or tools that can be lost during operation.

Other aspects, objects, and features of the present invention can be obtained from a study of the drawings, the disclosure, and the appended claims.

What is claimed is:

1. An adjustable link assembly comprising:
   a body portion having a polygonal shape in cross-section and an internally threaded bore;
   a first rod threadably engaging said internally threaded bore of said body portion;
   a second rod threadably engaged in said internally threaded bore of said body portion; and
   a locking mechanism including a lever and an engagement portion, said engagement portion having an internal passage having a polygonal shape larger than and slidably engaging and rotatably indexing said body portion along generally the entire length of said polygonal shape of said body portion
   wherein said body portion further includes a pair of receivers positioned at one end and extending radially outward therefrom; and
   wherein said body portion further includes a pair of expandable retainers one being positioned adjacent to each of said pair of receivers.

2. The adjustable link assembly of claim 1, wherein said lever includes an eye that engages a post on said first rod when said lever is in a first position.

3. The adjustable link assembly of claim 2 wherein the engagement of said eye of said lever with said post prevents relative motion between said first and second rods and said body portion.

4. The adjustable link assembly of claim 1, wherein said lever is held in the first position by at least one of the expandable retainers.

5. The adjustable link assembly of claim 1, further including a cylindrical portion extending from one end of said body portion providing area for rotational indexing of said engagement portion of said locking mechanism without rotating said body portion.

6. A hitch assembly adapted for coupling an implement to a work machine comprising:
   a pair of draft arms being pivotally connected to a frame of the work machine;
   a pair of rocker arms being pivotally connected to the frame of the work machine and connected with said draft arms; and
   an adjustable link assembly as set forth in claim 1 being connected with the frame.

7. The hitch assembly as set for the in claim 6 wherein said adjustable link assembly is centrally positioned between and elevationally spaced from said pair of draft arms.

8. The hitch assembly as set for the in claim 6 wherein said adjustable link assembly is connected between a one of said pair of draft arms and a one of said pair of rocker arms.

9. The hitch assembly as set for the in claim 8 further including another adjustable link assembly being connected between a one of said pair of draft arms and a one of said pair of rocker arms.

10. An adjustable link assembly comprising:
    a body portion having;
       a polygonal shape in cross-section and an internally threaded bore;
       a pair of receivers positioned at one end and extend radially outward therefrom; and
       a pair of expandable retainers one being positioned adjacent to each of said pair of receivers;
    a first rod threadably engaging said internally threaded bore of said body portion;
    a second rod threadably engaged in said internally threaded bore of said body portion; and
    a locking mechanism including a lever and an engagement portion, said engagement portion having an internal passage having a polygonal shape larger than and slidably engaging generally the entire length of said polygonal shape of said body portion.

11. The adjustable link assembly of claim 10, wherein said lever includes an eye that engages a post on said first rod when said lever is in a first position.

12. The adjustable link assembly of claim 11, wherein the engagement of said eye of said lever with said post prevents relative motion between said first and second rods and said body portion.

13. The adjustable link assembly of claim 10, wherein said lever is held in the first position by expandable retainer.

14. The adjustable link assembly of claim 10 further comprising a cylindrical portion extending from one end of said body portion providing area for rotational indexing of said engagement portion of said locking mechanism without rotating said body portion.

15. A hitch assembly adapted for coupling an implement to a work machine comprising:
   a pair of draft arms being pivotally connected to a frame of the work machine;
   a pair of rocker arms being pivotally connected to the frame of the work machine and connected with said draft arms; and
   an adjustable link assembly being connected with the frame, the adjustable link assembly including;
      a body portion having;
         a polygonal shape in cross-section and an internally threaded bore;
         a pair of receivers positioned at one end and extend radially outward therefrom; and
         a pair of expandable retainers one being positioned adjacent to each of said pair of receivers;
      a first rod threadably engaging said internally threaded bore of said body portion;
      a second rod threadably engaged in said internally threaded bore of said body portion; and
      a locking mechanism including a lever and an engagement portion, said engagement portion having an internal passage having a polygonal shape larger than and slidably engaging generally the entire length of said polygonal shape body portion.

16. The hitch assembly as set for the in claim 15, wherein said adjustable link assembly is centrally positioned between and elevationally spaced from said pair of draft arms.

17. The hitch assembly as set for the in claim 15, wherein said adjustable link assembly is connected between a one of said pair of draft arms and a one of said pair of rocker arms.

18. The hitch assembly as set for the in claim 17 further comprising another adjustable link assembly being connected between a one of said pair of draft arm and a one of said pair of rocker arms.

\* \* \* \* \*